United States Patent [19]

Selengut et al.

[11] Patent Number: 5,776,348
[45] Date of Patent: Jul. 7, 1998

[54] MINERAL PRECIPITATION SYSTEM AND METHOD FOR INHIBITING MINERAL PRECIPITATE FORMATION

[75] Inventors: Jeremy D. Selengut, Brookline; William H. Orme-Johnson, Cambridge; Stephen P. Dretler, Whayland; Hirotaka Asakura, Arlington, all of Mass.

[73] Assignee: Massachusetts Institute of Technology, Cambridge, Mass.

[21] Appl. No.: 385,241

[22] Filed: Feb. 7, 1995

[51] Int. Cl.$^6$ .................. C02F 5/10; C02F 5/12
[52] U.S. Cl. ........................... 210/698; 210/702
[58] Field of Search ..................... 210/702, 698

[56] References Cited

U.S. PATENT DOCUMENTS

| | | | |
|---|---|---|---|
| 4,587,021 | 5/1986 | Wheeler et al. | 210/698 |
| 4,833,074 | 5/1989 | Fagerhol et al. | |
| 5,350,687 | 9/1994 | Odink et al. | |

OTHER PUBLICATIONS

Bagley, "Pharmacologic Treatment of Infection Stones", Urologic Clinics of North America, vol. 14, No. 2, May 1987.

Bennett et al., "Identification of the Calcium–Binding Protein Calgranulin in the Matrix of Struvite Stones", Jour. of Endourology, vol. 9, No. 2, 1994.

Hedelin et al., "The Effects of Fractioned Human Urine of Urease–Induced Crystallisation In Vitro", Urol. Res., vol. 18, pp. 35–38, 1990.

Hess, "Prophylaxis of Infection–Induced Kidney Stone Formation", Urol. Res. vol. 18, pp. S45–S48, 1990.

Selengut et al., "Calgranulin in Matrix Protein", J. Urology, 149;232, 1993.

Selengut, "Studies in Biochemistry: Steriod Synthesis, P-450 Enzymology and Renal Lithogenesis", Ph.D. Dissertion, Massachusetts Institute of Technology Dept. of Chemistry, 1994.

Yamaguchi et al., "Heparan Sulfate in the Stone Matrix and its Inhibitory Effect on Calcium Oxalate Crystallization", Urol. Res. 21:187, 1993.

*Primary Examiner*—Neil McCarthy
*Attorney, Agent, or Firm*—Choate, Hall & Stewart

[57] ABSTRACT

The present invention provides a system for the analysis of mineral precipitate formation, and for the identification of compounds that affect mineral precipitation. The invention also provides methods and compositions for inhibiting formation of mineral precipitates, especially of mineral precipitates including struvite and/or calcium phosphate. Furthermore, the invention provides methods and compositions for the diagnosis and treatment of struvite kidney stones.

17 Claims, 6 Drawing Sheets

SEQUENCE LISTING ( 1 ) GENERAL INFORMATION:

( i i i ) NUMBER OF SEQUENCES: 4

( 2 ) INFORMATION FOR SEQ ID NO:1:

( i ) SEQUENCE CHARACTERISTICS:
        ( A ) LENGTH: 93 amino acids
        ( B ) TYPE: amino acid
        ( C ) STRANDEDNESS: single
        ( D ) TOPOLOGY: linear ( i i ) MOLECULE TYPE: protein ( i i i ) HYPOTHETICAL: NO ( i v ) ANTI-SENSE: NO ( v i i ) IMMEDIATE SOURCE:
        ( B ) CLONE: hMRP-8 protein ( x i ) SEQUENCE DESCRIPTION: SEQ ID NO:1:

```
Met Leu Thr Glu Leu Glu Lys Ala Leu Asn Ser Ile Ile Asp Val Tyr
  1               5                  10                  15

His Lys Tyr Ser Leu Ile Lys Gly Asn Phe His Ala Val Tyr Arg Asp
              20                  25                  30

Asp Leu Lys Lys Leu Leu Glu Thr Glu Cys Pro Gln Tyr Ile Arg Lys
              35                  40                  45

Lys Gly Ala Asp Val Trp Phe Lys Glu Leu Asp Ile Asn Thr Asp Gly
      50                  55                  60

Ala Val Asn Phe Gln Glu Phe Leu Ile Leu Val Ile Lys Met Gly Val
 65                  70                  75                  80

Ala Ala His Lys Lys Ser His Glu Glu Ser His Lys Glu
                  85                  90
```

( 2 ) INFORMATION FOR SEQ ID NO:2:

( i ) SEQUENCE CHARACTERISTICS:
        ( A ) LENGTH: 408 base pairs
        ( B ) TYPE: nucleic acid
        ( C ) STRANDEDNESS: both
        ( D ) TOPOLOGY: linear ( i i ) MOLECULE TYPE: cDNA ( i i i ) HYPOTHETICAL: NO ( i v ) ANTI-SENSE: NO (v i i) IMMEDIATE SOURCE:
    (B) CLONE: hMRP-8 cDNA (x i) SEQUENCE DESCRIPTION: SEQ ID NO:2:

| | | | | | |
|---|---|---|---|---|---|
| ATGTCTCTTG | TCAGCTGTCT | TTCAGAAGAC | CTGGTGGGGC | AAGTTCCGTG | GGCATCATGT | 60 |
| TGACCGAGCT | GGAGAAAGCC | TTGAACTCTA | TCATCGACGT | CTACCACAAG | TACTCCCTGA | 120 |
| TAAAGGGGAA | TTTCCATGCC | GTCTACAGGG | ATGACCTGAA | GAAATTGCTA | GAGACCGAGT | 180 |
| GTCCTCAGTA | TATCAGGAAA | AAGGGTGCAG | ACGTCTGGTT | CAAAGAGTTG | GATATCAACA | 240 |
| CTGATGGTGC | AGTTAACTTC | CAGGAGTTCC | TCATTCTGGT | GATAAAGATG | GGCGTGGCAG | 300 |
| CCCACAAAAA | AAGCCATGAA | GAAAGCCACA | AAGAGTAGCT | GAGTTACTGG | GCCCAGAGGC | 360 |
| TGGGCCCCTG | GACATGTACC | TGCAGAATAA | TAAAGTCATC | AATACCTC | | 408 |

(2) INFORMATION FOR SEQ ID NO:3:

(i) SEQUENCE CHARACTERISTICS:
    (A) LENGTH: 114 amino acids
    (B) TYPE: amino acid
    (C) STRANDEDNESS: single
    (D) TOPOLOGY: linear (ii) MOLECULE TYPE: protein (iii) HYPOTHETICAL: NO (iv) ANTI-SENSE: NO (vii) IMMEDIATE SOURCE:
    (B) CLONE: hMRP-14 protein (xi) SEQUENCE DESCRIPTION: SEQ ID NO:3:

```
Met Thr Cys Lys Met Ser Gln Leu Glu Arg Asn Ile Glu Thr Ile Ile
 1               5                  10                 15

Asn Thr Phe His Gln Tyr Ser Val Lys Leu Gly His Pro Asp Thr Leu
            20                  25                 30

Asn Gln Gly Glu Phe Lys Glu Leu Val Arg Lys Asp Leu Gln Asn Phe
        35                  40                  45

Leu Lys Lys Glu Asn Lys Asn Glu Lys Val Ile Glu His Ile Met Glu
    50                  55                  60

Asp Leu Asp Thr Asn Ala Asp Lys Gln Leu Ser Phe Glu Glu Phe Ile
65                  70                  75                  80

Met Leu Met Ala Arg Leu Thr Trp Ala Ser His Glu Lys Met His Glu
                85                  90                  95

Gly Asp Glu Gly Pro Gly His His His Lys Pro Gly Leu Gly Glu Gly
                100                 105                110

Thr Pro
```

(2) INFORMATION FOR SEQ ID NO:4:

(i) SEQUENCE CHARACTERISTICS:
    (A) LENGTH: 571 base pairs
    (B) TYPE: nucleic acid
    (C) STRANDEDNESS: both
    (D) TOPOLOGY: linear (ii) MOLECULE TYPE: cDNA (iii) HYPOTHETICAL: NO (iv) ANTI-SENSE: NO (vii) IMMEDIATE SOURCE:
    (B) CLONE: hMRP-14 cDNA ( x i ) SEQUENCE DESCRIPTION: SEQ ID NO:4:

| | | | | | | |
|---|---|---|---|---|---|---|
| AAACACTCTG | TGTGGCTCCT | CGGCTTTGAC | AGAGTGCAAG | ACGATGACTT | GCAAAATGTC | 60 |
| GCAGCTGGAA | CGCAACATAG | AGACCATCAT | CAACACCTTC | CACCAATACT | CTGTGAAGCT | 120 |
| GGGGCACCCA | GACACCCTGA | ACCAGGGGGA | ATTCAAAGAG | CTGGTGCGAA | AAGATCTGCA | 180 |
| AAATTTTCTC | AAGAAGGAGA | ATAAGAATGA | AAAGGTCATA | GAACACATCA | TGGAGGACCT | 240 |
| GGACACAAAT | GCAGACAAGC | AGCTGAGCTT | CGAGGAGTTC | ATCATGCTGA | TGGCGAGGCT | 300 |
| AACCTGGGCC | TCCCACGAGA | AGATGCACGA | GGGTGACGAG | GGCCCTGGCC | ACCACCATAA | 360 |
| GCCAGGCCTC | GGGGAGGGCA | CCCCCTAAGA | CCACAGTGGC | CAAGATCACA | GTGGCCACGG | 420 |
| CCACGGCCAC | AGTCATGGTG | GCCACGGCCA | CAGGCCACTA | ATCAGGAGGC | CAGGCCACCC | 480 |
| TGCCTCTACC | CAACCAGGGC | CCCGGGGCTG | TTATGTCAAA | CTGTCTTGCT | GTGGGGCTAG | 540 |
| GGGCTGGGGC | AAATAAAGTC | TCTTCCTCCA | A | | | 571 |

MINERAL PRECIPITATION SYSTEM AND METHOD FOR INHIBITING MINERAL PRECIPITATE FORMATION

GOVERNMENT SUPPORT

The work described herein was supported in part by National Institutes of Health grant number GM-28358. The United States Government may have certain rights in the invention.

BACKGROUND OF THE INVENTION

Kidney stones, also known as "renal calculi", are concretions that consist primarily of inorganic and organic salts that form in the renal collecting system. Kidney stones develop through a combination of crystal nucleation, growth, and aggregation processes, and become symptomatic when they achieve a size and/or shape that precludes their exit from the kidney by way of the ureter. Blockage of the ureter by a kidney stone causes extreme pain and, if the stone is not passed into the bladder by the peristaltic (spasmodic) action of the surrounding musculature, the blockage will result in interruption of urine flow and subsequent renal damage (for review, see Coe et al. NEJM 327: 1141, 1992).

Kidney stones are typically categorized on the basis of their mineral components. The most common kidney stones are those that include calcium oxalate ($CaC_2O_4$), often in combination with a calcium phosphate mineral such as hydroxyapatite ($Ca_5OH(PO_4)_3$) or brushite ($CaHPO_4$). Other kidney stones are composed of struvite ($MgNH_4PO_4$), often mixed with either hydroxyapatite or carbonate-apatite ($Ca_{10}CO_3(PO_4)_6$). Struvite and struvite/apatite stones are typically observed in individuals who have developed an infection of the urinary tract; kidney stones that are associated with such an infection are termed "infection stones".

In addition to their mineral components, kidney stones have a "matrix" component, consisting of proteins and other organic substances (e.g. nonamino sugars, glucosamine, organic ash, etc.) that are incorporated into the stones and account for approximately 2–3% of the stones' weight. In fact, there is a category of rare kidney stones, known as "matrix stones", that is composed primarily of matrix material (see, for example, Boyce Am. J. Med. 45: 673, 1968). The exact composition of the kidney stone matrix is unclear, and seems to vary among different types of stones (see, for example, Spector et al. Invest. Urol. 13: 387, 1976 Sugimoto Eur. Urol. 2: 334, 1985; Jones et al. J. Urol. 144: 1010, 1990). Several protein components of the calcium oxalate stone matrix have been identified and characterized (see, for example, Keutel et al. Invest. Urol. 2: 115, 1964; Kohri et al. J. Biol. Chem. 268: 15180, 1993; Nakagawa et al. J. Clin. Invest. 79: 1782, 1987); but no such data are available for the proteins of the struvite stone matrix.

The mechanism of kidney stone formation is as yet unclear, and effective procedures for preventing or reversing stone formation remain elusive. In the case of calcium oxalate stones, it is known that calcium oxalate is present at supersaturating concentrations in urine, and small calcium oxalate crystals are commonly observed in urine of healthy individuals. It has therefore been proposed that urine naturally contains substances that inhibit the development of large calcium oxalate crystals, and that calcium oxalate kidney stones result when a normal crystallization-inhibitory system goes awry. Consistent with this hypothesis, studies have identified various urine components that can inhibit calcium oxalate crystal formation and/or aggregation (see, for example, Nakagawa et al. supra; Asplin et al. Am. J. Physiol. 261: F824, 1991; Hess et al. Am. J. Physiol. 260: F569, 1991; Shiraga et al. PNAS 89: 426, 1992; Atmani et al. Urol. Res. 1993; Yamaguchi et al. Urol. Res. 21: 187, 1993;

Costello U.S. Pat. No. 5,279,827; Hoyer et al. U.S. Pat. No. 5,304,496; Thomas et al. U.S. Pat. No. 5,376,553, and references cited therein).

The situation is somewhat different for struvite and struvite/apatite stones. Struvite and carbonate-apatite are not present at supersaturating concentrations in normal urine. Nonetheless, arguments have been made that supersaturation is required for crystal formation, and the dominating hypothesis has been that struvite and/or struvite apatite stones can only form after urine has been alkalinized by infection with a urease-producing organism, the alkalinization resulting in effective supersaturation of the urine with infection stone components (see, for example, Lerner et al. J. Urol. 141: 753, 1988). However, it is also known that struvite stones are sometimes formed in the apparent absence of infection with a urease-producing organism (see, for example, Bratell Eur. Urol. 17: 58, 1990). Furthermore, infection with a urease-producing organism does not always lead to stone formation. Clearly, there is a need for more information about the mechanism of formation of infection stones, and about ways to inhibit struvite and/or struvite/apatite stone formation. It has previously been demonstrated that both macromolecular and non-macromolecular urine components can inhibit urease-induced precipitation of calcium and struvite phosphate (Hedelin et al. Urol. Res. 18: 35, 1990). However, the components responsible for this inhibition have not been identified.

Thus, there remains a need for identification of factors that are capable of inhibiting kidney stone formation, and especially of factors that are capable of blocking the development of struvite and/or struvite/apatite stones. There is also a need for identification and characterization of the components of the kidney stone matrix, especially components of the matrix of struvite and/or struvite/apatite stones.

SUMMARY OF THE INVENTION

The present invention relates to the identification and characterization of a protein factor that is a component of the matrix of struvite stones. The protein factor, known as "calprotectin", has been previously characterized as an abundant granulocyte protein factor with calcium-binding and anti-microbial properties. Calprotectin comprises about 40% of the protein in struvite kidney stones.

The present invention also relates to the identification of a factor that inhibits the formation of mineral precipitates, especially of precipitates including struvite, struvite/apatite, and/or calcium phosphate minerals, from solution. The term "calcium phosphate minerals", as used herein, refers to any calcium-phosphate-containing mineral, and encompasses, for example, hydroxyapatite, carbonate-apatite, and/or calcium phosphate. The phrase "formation of a mineral precipitate" encompasses any or all of the processes of precipitation, particle growth, and particle aggregation, where "particles" are any mineral precipitates, including amorphous precipitates and crystals. The phrase "formation of a mineral precipitate" therefore encompasses the processes of crystal nucleation, crystal growth, crystal aggregation. Also, a "mineral precipitate", as defined herein, is any crystalline or amorphous solid material that includes one or more minerals.

The present invention provides a method for inhibiting formation of a mineral precipitate in a solution. In preferred embodiments of the invention, the growth of struvite precipitates and/or the aggregation of struvite particles, calcium phosphate mineral particles, and/or combinations thereof is inhibited. Preferably, the mineral precipitate includes a mineral selected from the group consisting of: struvite, hydroxyapatite, carbonate-apatite, and calcium phosphate.

The method of the present invention comprises the steps of (a) providing a solution comprising component ions of the mineral precipitate, or precursors thereof; and (b) contacting the solution with isolated calprotectin, or with a calprotectin derivative. The term "isolated", as used herein, means (i) separated from at least some of the components with which it is associated in nature, (ii) produced by a method other than that by which it is produced in nature (e.g. from a nucleic acid produced using recombinant DNA techniques, synthesized by chemical synthesis methods, etc.), (iii) associated with chemical moieties (e.g. polypeptides, carbohydrates, fatty acids, etc.) other than those with which it is associated in nature, and/or (v) not naturally-occurring.

The method of the present invention may further include a step of initiating precipitation of minerals from the solution, for example by inducing mineral precipitation (e.g. by altering the pH of the solution), or by allowing the solution to stand until precipitation begins spontaneously. This initiating step may be performed before, after, or substantially simultaneously with the step of contacting the solution with calprotectin. In preferred embodiments of the method of the present invenion, the mineral solution comprises magnesium, phosphate, and ammonium ions, or precursors therefor (e.g. urea, magnesium chloride ($MgCl_2$), ammonium chloride ($NH_4Cl$), potassium phosphate ($KH_2PO_4$)), and the mineral precipitate comprises struvite crystals. In other preferred embodiments, the mineral solution comprises calcium and phosphate ions, or precursors therefor, and the mineral precipitate comprises calcium phosphate mineral crystals.

The present invention also provides a method for inhibiting or preventing struvite kidney stone formation in urine of a subject, the method comprising the steps of (a) providing isolated calprotectin, or a calprotectin derivative; and (b) contacting the urine with the isolated calprotectin, or with the calprotectin derivative. This method can be used to inhibit the formation of any kidney stone that includes detectable levels of struvite mineral, and the term "struvite kidney stone", as used herein, is intended to encompass both kidney stones in which struvite is the only mineral, and kidney stones that contain other minerals in addition to struvite.

The present invention provides a method for treating struvite stones in a subject, the method comprising the steps of (a) providing isolated calprotectin, or a calprotectin derivative; and (b) contacting the subject's urine with the isolated calprotectin, or with the calprotectin derivative.

The present invention also provides an artificial urine system comprising (a) a precipitation solution comprising magnesium, phosphate, and ammonium ions, or precursors therefor, but not including a precipitation substrate (e.g. a glass rod or seed crystals); and (b) means for analyzing mineral precipitates that form in the precipitation solution.magnesium, phosphate, and ammonium ions (and/ or calcium ions), or precursors thereof, and not including a precipitation substrate. In preferred embodiments, the artificial urine system of the present invention further comprises means for initiating formation of a mineral precipitate (e.g. alkalinizing means, or a delay in time sufficient to allow spontaneous mineral precipitate formation). The artificial urine system of the present invention may further include means for analyzing the rate of formation, extent of formation, and/or chemical composition of mineral precipitates formed therein. For example, the artificial urine system may include a spectrophotometer, a centrifuge, and/or a microscope.

The present invention also provides various pharmaceutical compositions including calprotectin, or a derivative thereof, for use in the prevention and/or treatment of kidney stone disease, and particularly for the prevention and/or treatment of kidney stones associated with urinary tract infection. Preferred pharmaceutical compositions of the present invention include means for delivering the calprotectin or derivative thereof into the urine of a subject.

The invention also provides a method of diagnosing susceptibility to struvite kidney stone formation, the method comprising the steps of (a) providing a urine sample from a subject having a urinary tract infection; (b) detecting a level of calprotectin present in the urine sample; (c) comparing the detected calprotectin level with a standard calprotectin level to determine a difference between the detected calprotectin level and the standard calprotectin level, the difference being indicative of a susceptibility to infection stone formation. The "standard" calprotectin level can be, for example, a pre-determined level of calprotectin that is known not to be associated with susceptibility to struvite kidney stone formation, or a concomitantly-determined level of calprotectin present in a sample from a subject with no known susceptibility to struvite kidney stone formation and/or not having a urinary tract infection.

The invention also provides a kit for diagnosing susceptibility to infection stone formation.

Additionally, the invention provides a method for identifying compounds that alter the rate or extent of mineral precipitate formation in a solution, comprising the steps of (a) providing a solution comprising component ions of the mineral precipitate or precursors thereof; (b) contacting the solution with a test compound; and (c) detecting a difference between the rate or extent of mineral precipitate formation in the presence of the compound and the rate or extent of mineral precipitate formation in the absence of the compound.

The invention also provides a method of identifying a calprotectin derivative with altered inhibitory activity toward mineral precipitate formation, the method comprising the steps of (a) providing a calprotectin derivative that differs from normal calprotectin in that at least one chemical moiety that is present in normal calprotectin is not present in the calprotectin or at least one chemical moiety that is present in the calprotectin derivative is absent from normal calprotectin; and (b) testing the ability of the calprotectin derivative to inhibit formation of a mineral precipitate in a solution to detect a difference between the ability of derivative and that of calprotectin to inhibit mineral precipitate formation.

DESCRIPTION OF PREFERRED EMBODIMENTS OF THE INVENTION

Identification of a struvite matrix protein

Figure 1:
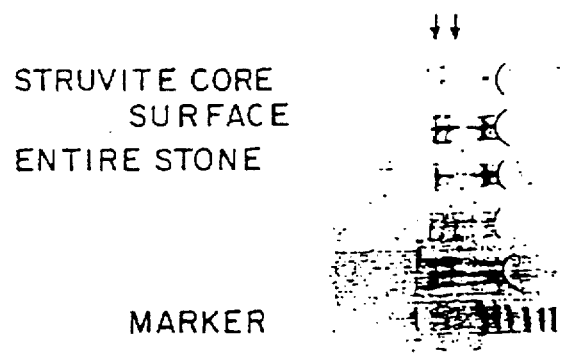
FIG. 1 presents an electrophoresis gel of the protein components of a struvite stone core, a struvite stone surface, and an entire struvite stone.

As mentioned above, the present invention relates to the identification of a protein component of the struvite stone matrix. The procedures used to isolate and analyze struvite matrix components are set forth in detail in Example 1 (see also Bennett et al. J. Endourol. 8: 95, 1994; Selengut Ph.D. Dissertation, Massachusetts Institute of Technology, 1994, each of which is incorporated herein by reference). Essentially, struvite stones were pulverized, the pulverized components were solubilized, and the mixture was separated by electrophoresis on denaturing polyacrylamide gels. The results are presented in FIG. 1. Approximately 40% of the struvite stone matrix protein was present in two distinct bands, of approximately 8 kDa and 14 kDa, respectively.

The proteins in the 8 kDa and 14 kDa bands were subjected to amino acid analysis by Edman degradation. The sequence of the first seventeen amino acids of the smaller protein was identical to that of Migration Inhibitory Factor Related Protein-8 (MRP-8), a previously-identified (see, for example, Odink et al. Nature 330: 80, 1987) calcium-binding protein that is a member of the S100 family of calcium-binding proteins. MRP-8 is typically found in association with another calcium-binding protein, known as MRP-14, in a complex that is variously termed "calprotectin" (see, for example, Odink et al. id; Steinbakk et al. Lancet 1: 763, 1990), "cystic fibrosis-associated antigen" (see, for example, Bullock Clin. Gen. 21: 336, 1982), "leukocyte antigen L1" (see, for example Dale et al. Eur. J. Biochem. 134: 1, 1983), or "calgranulin" (see, for example, Wilkinson et al. J. Cell. Sci. 91: 221, 1988). Hereinafter, we refer to this complex as "calprotectin".

Figure 2:
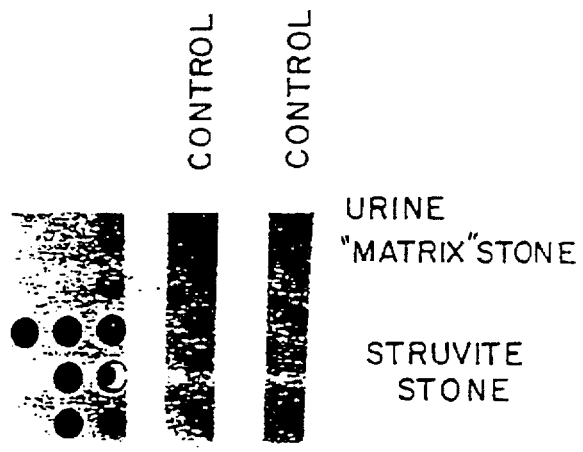
FIG. 2 presents an ELISA showing that the major protein component of struvite kidney stones in calprotectin.

We were unable to obtain N-terminal sequence information for the larger protein from our gel, consistent with known information that the N-terminus of MRP-14 is blocked (Bruggen et al. Nature 33: 570, 1988). We confirmed that calprotectin is a protein component of struvite kidney stones by performing an enzyme-linked immunosorbant assay (ELISA) with a commercially available (DAKO, Carpeteria, Calif.) monoclonal antibody to calprotectin (see FIG. 2). Recent evidence suggests that this antibody recognizes an epitope on MRP-14 (Goebler et al., J. Leuk. Biol. 55: 259, 1994).

It was somewhat surprising that calprotectin constitutes such a large fraction of the struvite stone matrix (approximately 40% of the matrix protein is calprotectin). The matrix of calcium oxalate kidney stones, by contrast, contains many different proteins, with no one protein component being particularly more prevalent than the others (see, for example, Sugimoto supra; Resnick supra). The finding that calprotectin dominates the struvite stone matrix suggests that calprotectin may play a role in the formation of struvite kidney stones. However, this finding, in and of itself, does not provide any information about what calprotectin's role might be.

Calprotectin is known, among other things, to have antimicrobial properties (Rekha et al. J. Immunol. 151: 6291, 1993; Sohnle et al. J. Inf. Dis. 163: 187, 1990; Miyasaki et al., J. Dent. Res. 72: 517, 1993; Steinbakk, Loncet 336: 763, 1990) to be present at high levels in granulocyte cytoplasms (Edgeworth et al. J. Biol. Chem. 266: 7706, 1991), and to be released at the time of granulocyte death (Lehrer J. Lab. Clin. Med. 121: 193, 1993). It therefore seems likely that calprotectin is concentrated at sites of inflammation and infection, where neutrophil turnover is high. Calprotectin may well be present at high levels at sites of urinary tract infection, for example; however, even if this is true, it does not explain how or why calprotectin becomes incorporated into kidney stones that form at infection sites. In fact, several different hypotheses can be proposed, each of which is arguably supported by findings in the related field of calcium oxalate stone formation.

For example, researchers have argued that some calcium oxalate matrix components are incorporated into calcium oxalate stones in a highly selective manner, and may contribute to or promote stone formation (see, for example Boyce Am. J. Med. 45: 673; Nishio et al. J. Urol. 134: 503, 1985; Roberts et al. J. Urol. 135: 1078, 1986; Morse et al. J. Urol. 139: 869, 1988). It is possible, then, that calprotectin promotes struvite stone formation, and is incorporated into the matrix by virtue of its stimulatory role.

On the other hand, evidence has been presented that calcium oxalate matrix formation occurs by random adsorption of urinary macromolecules onto urinary crystals (see, for example, Finlayson et al. J. Urol. 86: 355, 1961; Murphy et al. Br. J. Urol. 34: 129, 1962; Scurr et al. in Urolithiasis, Smith et al. eds., Plenum Press, NY, 1980). Thus, the argument can be made that calprotectin is incorporated into struvite stones at high levels simply because it is present at high local concentrations at urinary tract infection sites.

Yet another possibility is that calprotectin naturally inhibits struvite stone formation, and only gets incorporated into a stone when the inhibitory mechanism is overwhelmed or ineffective for some reason. It has recently been reported that a calcium oxalate matrix component may naturally inhibit calcium oxalate stone formation (Yamaguchi et al. Urol. Res. 21: 187, 1993).

EXAMPLE 1

Identification of Calprotectin in Struvite Stones

Stone Preparation—Five struvite stones were obtained from the Kidney Stone Center at the Massachusetts General Hospital and identified as such by a variety of mineralogical techniques (polarization microscopy, X-ray diffraction, infrared analysis). The stones were washed with sterile water to rinse away any contamination and crushed to a fine powder. In addition, two stones were separated into core and surface components, which were then pulverized individually. The powder from each of the stones was solubilized in a combination of 0.1M EDTA, 10M urea, and 0.2M beta-mercaptoethanol. The suspensions were placed in a waterbath at 100° C. for 1 hour and centrifuged at 12,000 rpm for 8 minutes. The supernatant fluids were collected, and the residual stone material was resuspended in the above solution and again placed in the waterbath. After two or three extractions, the stones were completely solubilized. Protein components of the supernatant fluids were then precipitated by trichloroacetic acid (TCA) using 2% sodium deoxycholate followed by 24% (w/v) TCA. The proteins were resuspended in Laemmli buffer and separated by sodium dodecyl sulfate (SDS) gel electrophoresis using homogeneous 20% acrylamide gels at 10 mA in the Phast mini-electrophoresis system (Pharmacia). The proteins were identified by either silver nitrate or Coomassie blue stain.

Amino Acid Analysis—Samples of struvite stones were solubilized as described above, and the supernatant fluids were subjected to electrophoresis on 15% acrylamide slab gels at 14 mA for 1 hour. The proteins were electroblotted onto Pro-Blott membranes at 200 mA for 90 minutes. The membranes were stained with Coomassie blue, and the two low molecular weight bands were excised and subjected to Edman degradation to determine their N-terminal sequences. These sequences were then compared with the available amino acid sequence database.

Protein Identification—Commercially available monoclonal antibodies to calprotectin (DAKO, Carpeteria, Calif.) were used in an enzyme-linked immunosorbant assay (ELISA). The supernatant fluids from the earlier solubilization were serially diluted and blotted onto nitrocellulose paper where the ELISA was performed. Subsequently, the nitrocellulose was blocked overnight using blocking buffer (1 g of dried milk in 100 mL of phosphate-buffered saline). The primary antibody (mouse anti-calprotectin) was incubated with the nitrocellulose for 1 hour. After washing with blocking buffer for 20 minutes, biotinylated horse anti-mouse antibody (Pierce, Rockford, Ill.) was added for 30 minutes. The nitrocellulose was again washed with blocking buffer for 20 minutes before a complex of avidin and biotinylated horseradish peroxidase was added for 30 minutes. The presence of calprotectin was detected by either 4-chloro-1-napthol (4CN) or o-phenylenediamine (OPD) substrate (both supplied by Pierce).

Inhibition of mineral precipitate formation

One aspect of the present invention relates to the identification of a compound capable of inhibiting formation of mineral precipitates in a mineral solution. In particular, the invention encompasses the discovery that calprotectin inhibits the formation of struvite- and/or calcium-phosphate-containing precipitates. In fact, we have found that calprotectin inhibits at least two steps of mineral precipitate formation: (i) aggregation of struvite particles and/or calcium phosphate mineral particles; and (ii) struvite precipitation and/or particle growth. The invention provides an artificial urine system in which the effects of calprotectin on the rate, amount, and/or nature of mineral precipitate formation are analyzed. Details relating to the artificial urine system of the present invention are presented in Examples 2–4.

Basically, the artificial urine systems described in Examples 2–4 comprise solutions containing urea, magnesium, calcium, ammonium, and phosphate, each in an amount comparable to that found in normal human urine. Isolated calprotectin, or another compound against which the effects of calprotectin are to be compared, is added to the solutions, followed by urease. Urease splits urea molecules into ammonia and carbonate, thereby alkalinizing the solution and inducing crystallization of struvite and/or calcium phosphate minerals.

The artificial urine system of the present invention is manipulable so that precipitate formation proceeds for different lengths of time, and/or occurs under different conditions (e.g. different pH, temperature, pressure, viscosity, and/or agitation; in the presence of different minerals, proteins, and/or other potential stone components; with or without the exchange of gases with the environment; etc.). For example, the rate of precipitate formation in the system can readily be controlled by regulating the amount of urease that is added to the solution. The Examples presented herein describe three different embodiments of the artificial urine system of the present invention: Rapid Formation, in which high levels of urease are added to the solution with constant stirring, to the solution, and precipitate formation occurs within one hour (see Example 2); Intermediate Speed Formation, in which intermediate levels of urease are added to the solution with constant slow agitation, and precipitate formation occurs over a 5–8 hour time period (see Example 3); and Slow Formation, in which low levels of urease are added to the solution in the absence of stirring and large precipitates are allowed to develop for a period of about 1–3 days (see Example 4).

Samples of the artificial urine system of the present invention can be removed at any time for analysis of, for example, (i) the time of initiation of precipitation and/or of crystal nucleation; (ii) the rate and/or extent of particle aggregation; and/or (iii) the chemical composition, protein content, size, size distribution, surface charge, morphology, and/or adhesion properties (e.g. toward surfaces such as other mineral crystals, epithelial cells, bacterial cells (with or without any naturally-occurring extracellular coatings), medical apparatuses (e.g. catheters, stents, wires, or sutures)) of precipitates produced in the system. These analyses can be performed using any available technique, including those described herein (see Examples 2–4). Available methods for analysis of initiation time, aggregation, crystal size, and/or surface charge include, for example, those described by Hess et al. (Am. J. Physiol. 257: F99, 1989) and Edin-Liljegren et al. (J. Urol. 152: 208, 1994); methods for analyzing crystal morphology include those described by McClean et al. (Urol. Res. 18: 39, 1990), Abbona et al. (J. Crystal Growth 46: 339, 1979), Clapham et al. (J. Crystal Growth 104: 475, 1990), and Nickel et al. (Urology 28: 512, 1986); methods for analyzing adherence properties include those of Grenabo (J. Urol. 140: 428, 1988) and those of Griffith (Invest. Urol. 13: 346, 1976), each of which is incorporated herein by reference.

For example, turbidity of the solution, which reflects the number of particles in the solution but is not significantly influenced by the size of those particles, can be monitored by spectrophotometry, preferably in real-time so that both the initiation of precipitation and/or crystal nucleation and the rate and extent of particle aggregation can be monitored. Aggregation can also be monitored by microscopy, and particles produced in the system can be analyzed, for example by colorimetric techniques to determine their chemical composition and/or protein content. Microscopic analysis of particles can provide morphological information, especially when it is performed on relatively large crystals such as those produced in the Slow Formation system, and can also reveal information about mineral type and growth rate when analyzed in accordance with known techniques such as, for example, those described by Abbona et al. (supra, incorporated herein by reference).

We have used a Rapid Formation embodiment of the artificial urine system of the present invention to examine the effects of calprotectin on struvite and/or calcium phosphate mineral precipitate formation (see Example 2). We followed both (i) the timing of precipitation and/or crystal nucleation initiation; and (ii) the timing, rate, and extent of particle aggregation by spectrophotometric analysis of the solution turbidity; our results are presented in FIGS. 3–8.

Figure 3:
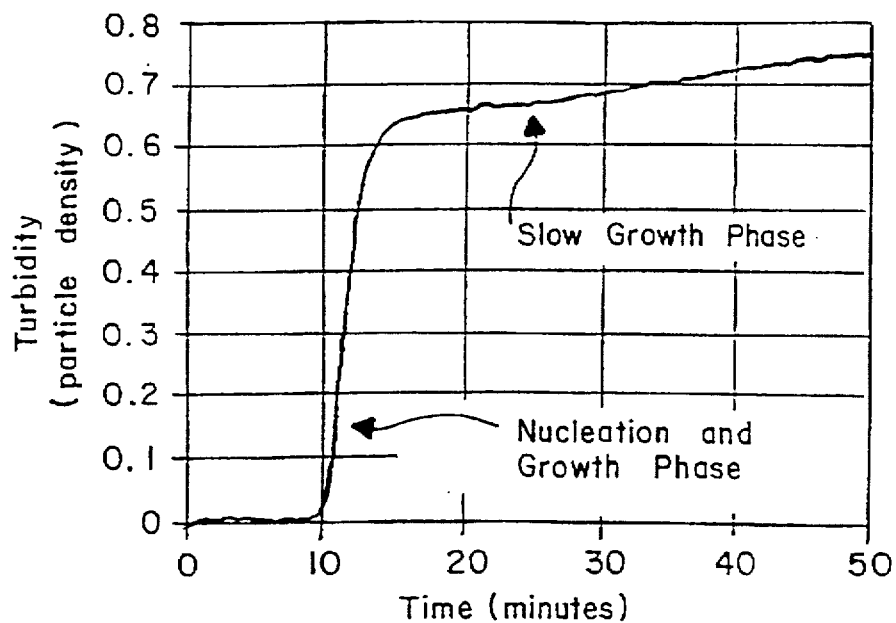
FIG. 3 presents a plot of trubitity versus time in a precipitation solution lacking calcium.

As described in Example 2, we prepared a first precipitation solution in which urea, magnesium, ammonium, and phosphate were combined, in the absence of calcium, and alkalinization was initiated with urease. The formation of mineral precipitates in this solution was monitored by spectrophotometric analysis of solution turbidity. FIG. 3 presents a plot of turbidity versus time for this first precipitation solution. As can be seen, in the absence of calcium, precipitate formation proceeds through two phases, an initial burst of precipitation when the saturation point is reached (in this system, at around pH 7.2), followed by a period of slower particle growth. Aggregation after the initial burst, which would be observed as a decrease in particle density, is not a significant factor under these conditions. Addition of calprotectin to this solution results in an increase in the number of particles, corresponding to a decrease in mean particle size. The same effect is observed if bovine serum albumin (BSA) is added instead of calprotectin, indicating that the effect is likely to be non-specific and to be reflective of the effects of impurities in precipitating systems, rather than of a specific, protein-induced, effect.

Figure 4:
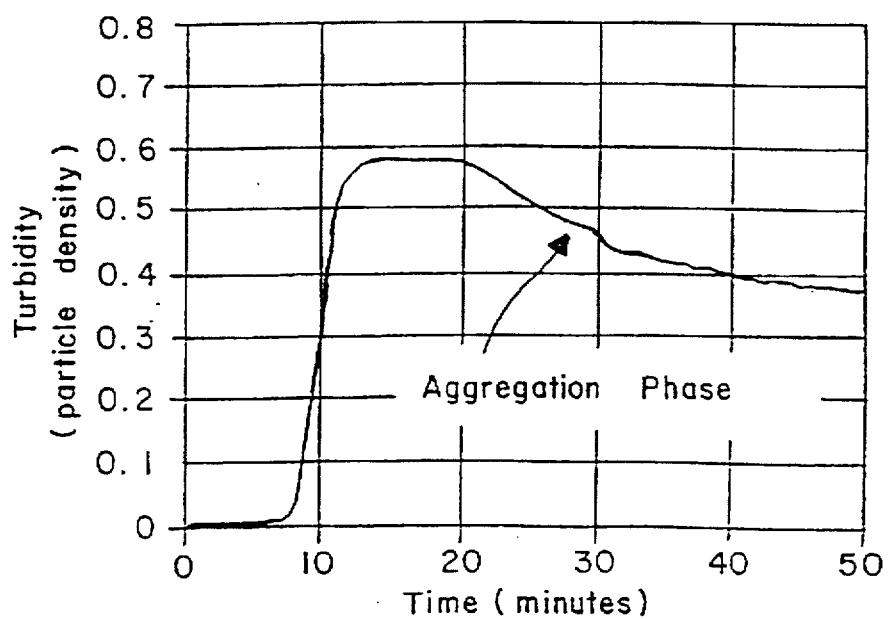
FIG. 4 presents a plot of turbidity versus time in a precipitation solution that includes calcium.

As also described in Example 2, we prepared a second precipitation solution identical to the first precipitation solution except that calcium ions were also present in the second solution (See FIG. 4). As shown in FIG. 4, low levels of calcium (less than 25% of the calcium levels observed in normal human urine) are sufficient to allow particle aggregation in an artificial urine system of the present invention.

Figure 5:
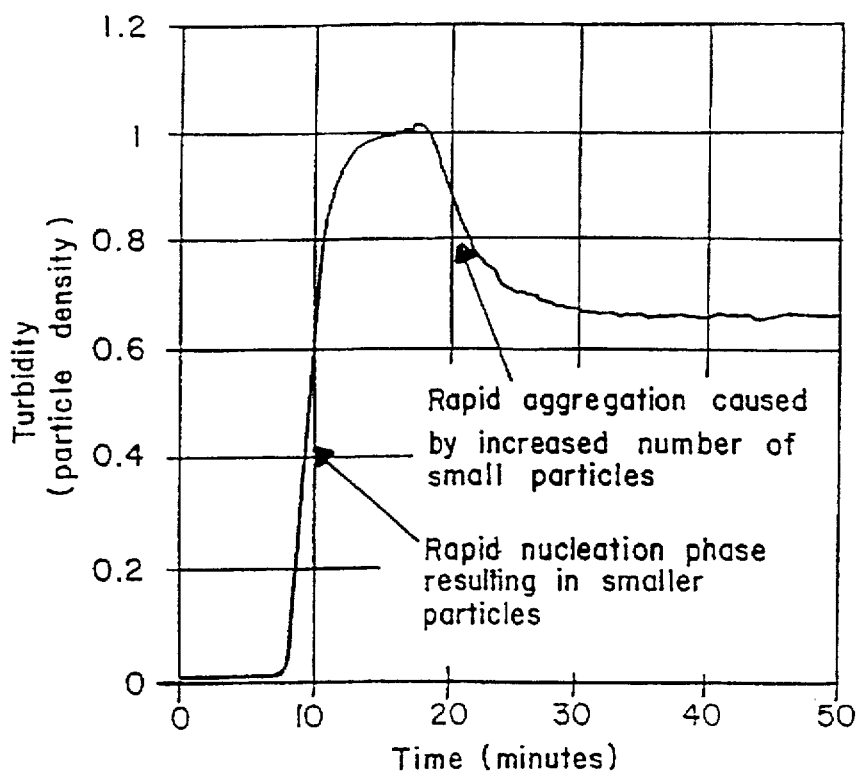
FIG. 5 presents a plot of turbidity versus time in a calcium-containing precipitation solution in the presence of BSA.
Figure 6:
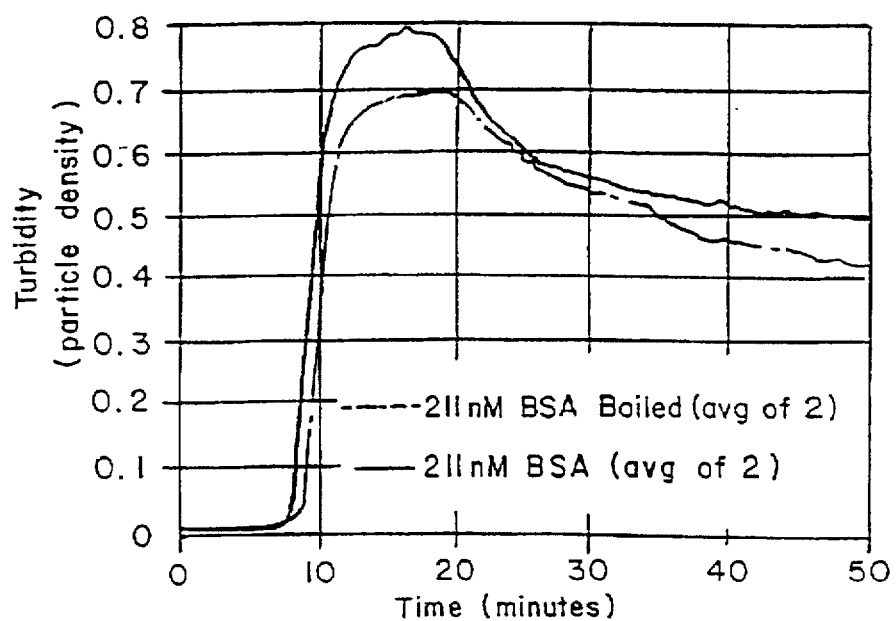
FIG. 6 presents a plot of turbidity versus time in a calcium containing precipitation solution, in the presence of boiled BSA.

When BSA is added to this system, the initial burst is exaggerated, resulting in a larger number of particles, presumably of smaller average particle size, than is observed in the absence of BSA (see FIG. 5). Particle aggregation occurs in the presence of BSA; in fact, there is a greater amount of net aggregation in the presence of BSA than in its absence. Substantially the same effect is observed if the BSA has been denatured by boiling prior to its addition to the artificial urine system (see FIG. 6), indicating that the effect is likely to be non-specific and reflective merely of the presence of a protein, rather than of the particular activities or characteristics of that protein.

Figure 7:
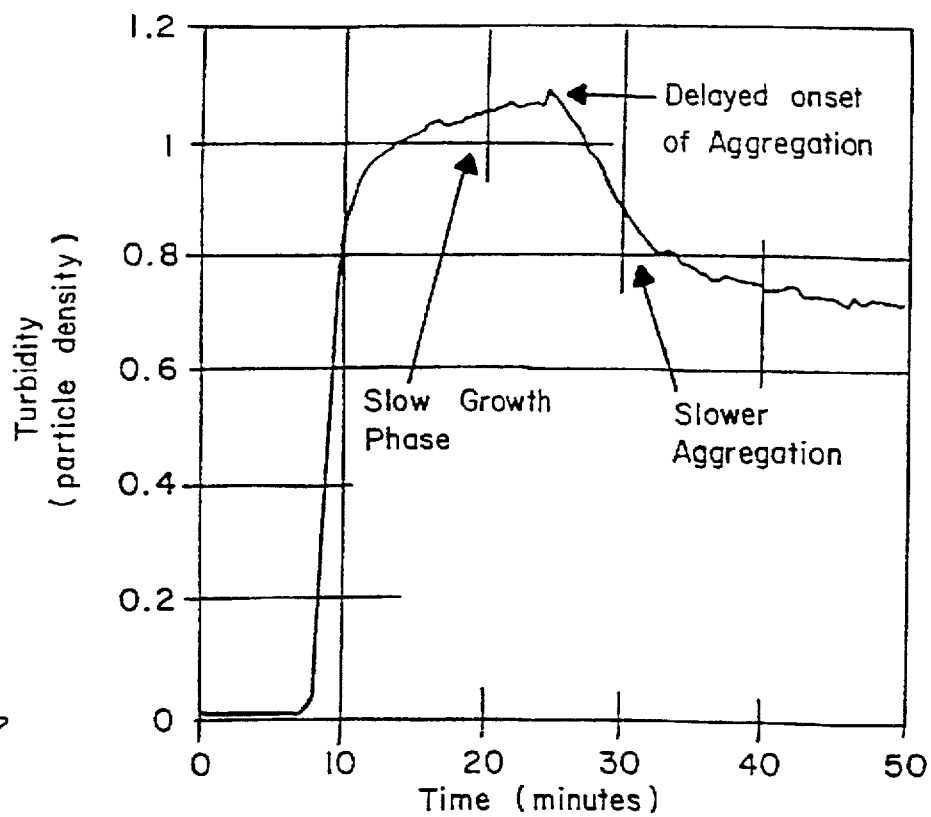
FIG. 7 presents a plot of turbidity versus time in a calcium-containing precipitation solution in the presence of calprotectin.
Figure 8:
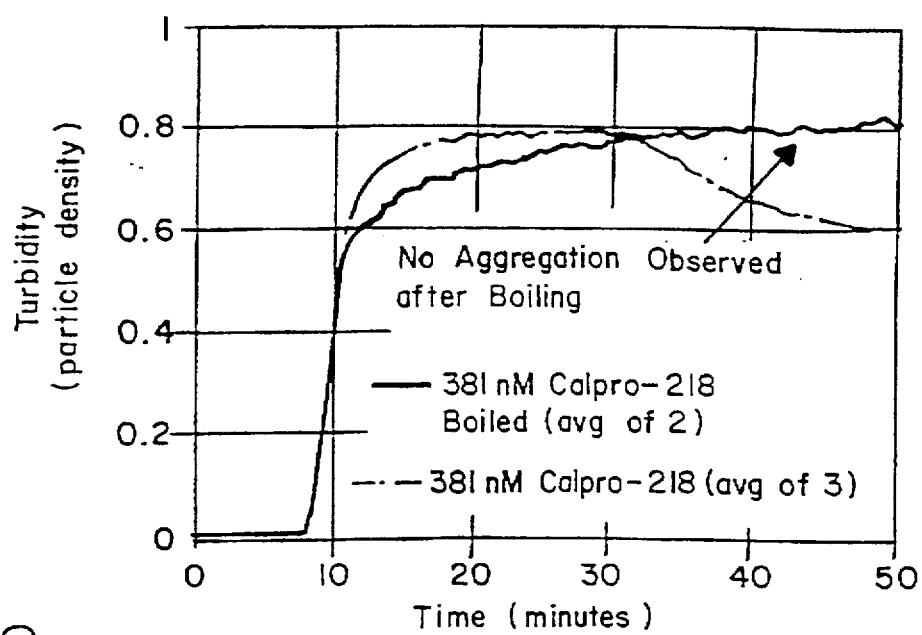
FIG. 8 presents a plot of turbidity versus time in a calcium-containing precipitation solution in the presence of boiled calprotectin.

Addition of calprotectin to the artificial urine system of Example 2 results in an exaggeration of the initial nucleation phase, similar to the effect observed with BSA (see FIG. 7). However, unlike BSA, calprotectin has an inhibitory effect on particle aggregation in the system. In particular, the onset of particle aggregation is significantly delayed in the presence of calprotectin. Furthermore, if the calprotectin sample is boiled prior to its addition to the artificial urine system, the boiled calprotectin has an even more dramatic inhibitory effect on particle aggregation (see FIG. 8). Unlike BSA, calprotectin is stable to boiling in basic solutions (Dale et al. Eur. J. Biochem. 134: 1, 1986). The enhancement of calprotectin inhibitory activity after boiling may therefore reflect removal from the calprotectin sample of a factor that functions as an aggregation promoter. Alternatively, it is possible, for example, that boiling modifies calprotectin in some way that enhances it inhibition activity.

Whatever the explanation for the effects we have observed, we have clearly demonstrated that calprotectin inhibits formation of mineral precipitates. In particular, we have demonstrated that calprotectin inhibits the aggregation of struvite and/or calcium phosphate mineral particles.

We have also used the artificial urine system of the present invention to demonstrate that calprotectin inhibits the growth of struvite particles. In particular, as described in Example 3, we have used an Intermediate Speed Formation embodiment of the artificial urine system of the present invention to examine the effects of calprotectin on the growth of particles containing struvite and/or calcium phosphate minerals. We followed calcium-containing and magnesium-containing mineral precipitate formation independently by colorometric techniques (see Example 3). The results of these studies are presented in FIGS. 9–11.

As described in Example 3, we prepared three different precipitation solutions. All three contained urea, ammonium and phosphate. The first additionally contained magnesium; the second additionally contained calcium; and the third additionally contained both magnesium and calcium. BSA alone, or BSA with calprotectin, was added to each solution such that the total amount of protein in all solutions was the same. Urease was added to each solution to initiate precipitate formation. At intervals, samples of the precipitates were analyzed for magnesium and calcium content.

Figure 9:
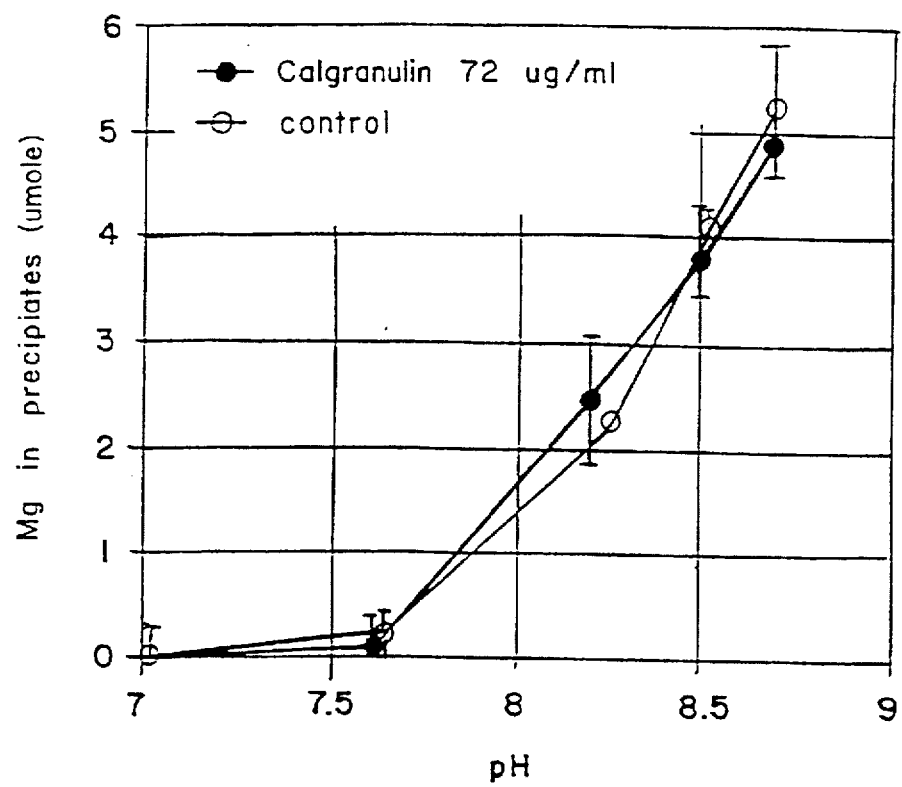
FIG. 9 presents a plot of magnesium content versus pH for a precipitation solution including urea, ammonium, phosphate, and magnesium, with and without calprotectin.
Figure 10:
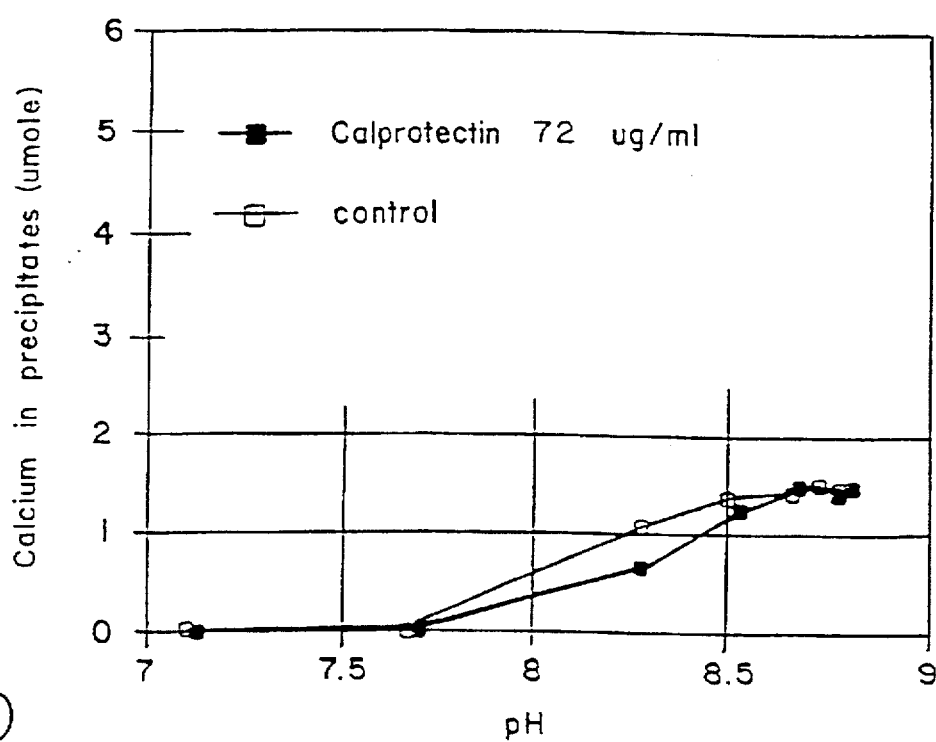
FIG. 10 presents a plot of calcium content versus pH for a precipitation solution including urea, ammonium, phosphate, and calcium, with and without calprotectin.
Figure 11:
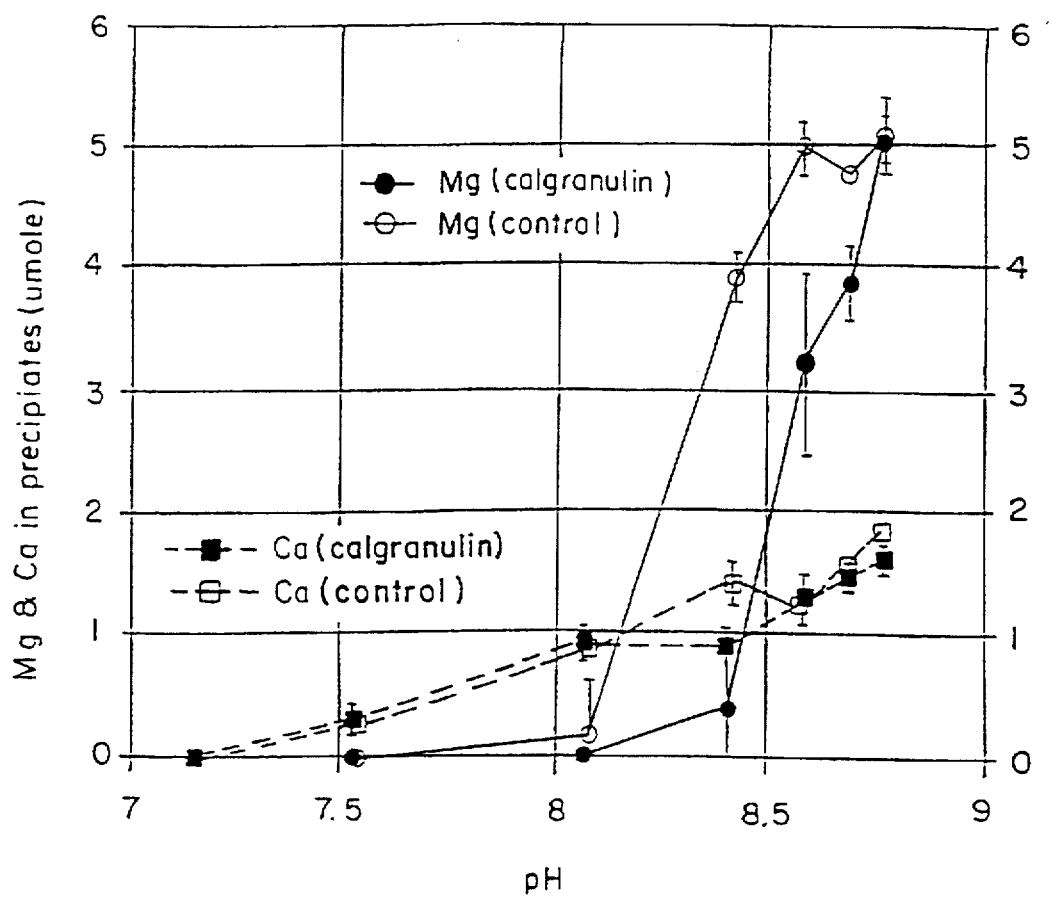
FIG. 11 presents plots of both magnesium and calcium content versus pH for a precipitation solution including urea, ammonium, phosphate, magnesium, and calcium, with and without calprotectin.

FIG. 9 presents a plot of magnesium content versus pH for the first solution, both with and without calprotectin. As can be seen, magnesium precipitation (in the form of struvite), in the absence of calcium, is unaffected by the presence of calprotectin. FIG. 10 presents a plot of calcium content versus pH for the second solution, both with and without calprotectin. As can be seen, the rate of calcium precipitation (in the form of calcium phosphate minerals), in the absence of magnesium, is somewhat reduced by the presence of calprotectin. FIG. 11 presents plots of both magnesium and calcium content versus pH for the third solution, both with and without calprotectin for each. As can be seen, in the presence of both calcium and magnesium, the precipitation of magnesium is inhibited by calprotectin such that it occurs largely at a higher pH. The rate of calcium precipitation under these conditions is also somewhat reduced.

These experiments measure the total precipitate formation, including the sum of all nucleation, growth and aggregation effects. It is possible that the anti-aggregation effect observed in the Fast Formation experiments (Example 2) is also present here. Whether or not calprotectin is inhibiting mineral aggregation in this system, it is clear that calprotectin is having a second, independent effect on the formation of mineral precipitates. That is, inhibition of mineral aggregation would be expected to result in an increase in particle growth rate, due to the increase in total surface area of the non-aggregated particles. Because we observe a decrease, rather than an increase in growth rate, we conclude that calprotectin, independent of its anti-aggregation activity, has particle-growth-inhibitory activity as well.

Without wishing to be bound by a particular hypothesis, we propose that calprotectin (in the presence of calcium) binds to particles of struvite and, in so doing, both decreases the growth rate of those particles and inhibits their aggregation with other particles of struvite and/or with calcium phosphate minerals. Whatever the mechanism, we have demonstrated that calprotectin inhibits both aggregation of struvite and/or calcium phosphate mineral particles, and the growth of struvite particles. Calprotectin thus has two distinct inhibitory effects on the formation of struvite mineral precipitates.

The artificial urine systems described herein were designed to include various ions at concentrations similar to the concentrations at which they are found in human urine. As would be readily apparent to one of ordinary skill in the art, other artificial urine systems can be prepared according to the present invention, and can be used in analyses of the formation of struvite-containing particles. For example, it may be valuable to prepare artificial urine systems that reflect (i) the ionic content of an animal other than a human; (ii) the ionic content of a particular human individual whose urine composition differs from that of the general population; (iii) the diurnal variations in human urine composition; or (iv) variations in human urine composition due to the consumption of certain foods or medicinal substances.

Also, the artificial urine systems described herein are minimal solutions in that they consist of only a particular selection of minerals and one or a few proteins. Of course, urine is a very complicated solution, with many organic and inorganic components. Other urine components (such as, for example, citrate, oxalate, glucosamino-glycans, pyrophosphate, lipids, etc.) could be included in the artificial urine system of the present invention without departing from the spirit or intent of the invention.

Additionally, while urease addition is the preferred mechanism for altering the pH of the artificial urine system of the present invention to induce precipitation, other methods could be used. Urease is preferred because it allows a smooth increase in pH, and also because it mimics the natural situation. However, as would be readily apparent to one of ordinary skill in the art, any available alkalinization technique can be used so long as it does not interfere with analysis of crystal formation.

In some cases, it may be desirable to include trace amounts of solid materials to act as nucleation sites, or "seeds", for particle formation. Larger solid surfaces, or even preformed crystals, could alternately be used as substrates onto which new particles can adhere.

The calprotectin utilized in the above-described studies with artificial urine systems of the present invention was isolated and purified according to the procedure set forth in Example 5. Other isolation and/or purification procedures could alternately be used (see, for example, Odink et al., U.S. Pat. No. 5,350,687; Berntzen et al. Scand. J. Clin. Lab. Invest. 50: 769, 1990; Edgeworth et al. J. Biol. Chem. 266: 7706, 1991; Teigelkamp et al. J. Biol. Chem. 266: 13462, 1991; each of which is incorporated herein by reference).

For example, the calprotectin could be produced recombinantly, for example in bacteria, according to known procedures (see, for example, Sambrook et al. *Molecular Cloning* Cold Spring Harbor Press, NY, 1989, incorporated herein by reference). The genes encoding the calprotectin subunits, MRP-8 and MRP-14, have been cloned from humans (see, for example, Lagasse et al. Mol. Cell. Biol. 8: 2402, 1988, incorporated herein by reference) and from rats (see, for example, Imamichi et al. Biochem. Biophys. Res. Com. 194: 819, 1993, incorporated herein by reference); the human MRP-8 protein and cDNA sequences are presented here as SEQ ID NOs: 1 and 2, respectively; the human MRP-14 protein and cDNA sequences are presented as SEQ ID NOs: 3 and 4, respectively. These sequences, or fragments thereof, can be incorporated into any of a variety of expression vectors, including vectors that include nucleic acid sequences that facilitate, for example, expression, purification, and/or detection of encoded calprotectin protein products. Such recombinant constructs can be introduced into a host cell in which the recombinant construct is expressed.

Calprotectin can be purified from such a host cell, or from any cell in which it is expressed, by utilizing any of the available protein purification techniques including, for example, ion exchange chromatography, affinity chromatography, gel filtration, immobilized metal ion affinity chromatography (IMAC), hydrophobic interaction chromatography (HIC), etc. (see, for example, Scopes *Protein Purification* Springer-Verlag, N.Y., 1987, incorporated herein by reference). Alternatively, calprotectin, or fragments thereof can be produced by, for example, chemical synthetic methods, or by chemical or enzymatic degredation of the native protein.

EXAMPLE 2

Determination of the Effects of Calprotectin on Formation of Struvite and Calcium Phosphate Mineral Precipitates Under Rapid Formation Conditions Precipitation solution—A first solution for the precipitation of struvite and calcium phosphate minerals under the action of urease was composed of the following: 3.2 mM Magnesium Chloride; 20.5 mM Potassium Phosphate; 18.7 mM Ammonium Chloride; and 416 mM Urea; pH 5.8. A second solution was prepared that was identical to the first except that it also included 1 mM Calcium Chloride.

Urease solution—A solution of urease (Sigma #U 0251) was prepared in Tris Buffered Saline (TBS: 10 mM Tris; 150 mM Sodium Chloride; pH=7.4), so that the urease was present at a concentration of 100 Units/ml.

Test Solutions—The following test solutions were prepared: (a) distilled water; (b) 1.4 µM BSA in TBS; (c) 211 nM BSA in TBS; (d) 211 nM BSA in TBS, heated to 100° C. for 10 minutes; (e) 1.4 µM calprotectin in TEED; (f) 381 nM calprotectin in TEED; (g) 381 nM calprotectin in TEED, heated at 100° C. for 10 minutes.

Spectrophotometric analysis of turbidity—The formation of mineral precipitates in the precipitation solution was analyzed in a spectrophotometer equipped with a temperature-controlled cuvette holder and a variable-speed magnetic stirrer. The spectrophotometer was programmed to read the absorbance of the solution in the cuvette at 550 nm every 30 seconds for a total averaging (integration) time of 5 seconds per data point. These readings continued for one hour. The results of these readings were output to a data file.

Method—To an acrylic cuvette (12×12×45 mm) was added: 1 magnetic stir bar (teflon coated, 2×2×7 mm); 2 ml precipitation solution; 100 µl test solution. The cuvette was placed in the spectrophotometer cuvette holder (temperature controller set to 25° C., stirring speed set to 800 rpm). The solution was allowed to equilibrate for one minute and a blank reading was taken. The spectrophotometer program was initiated. After the first data point was read (5 seconds) 50 µl of urease solution (see above) was added by volumetric pipette.

Data Analysis—Data collected was graphically represented as a linear-linear plot of absorbance vs. time. The crystal nucleation time $T_{nuc}$ was measured from this plot as the first time point in which the absorbance exceeds some threshold value (such 0.01 absorbance units). The maximum absorbance $A_{max}$ was determined from the raw data or the plot. In order to facilitate quantitative analysis, the data was sometimes transformed into slope vs. time format by commercial tangent-fitting algorithms, or simply by the formula:

$$\text{Slope } (T_n) = Abs(T_{n-1}) - Abs(T_{n+1})$$

where $T_n$ is the a particular time point, $T_{n-1}$ is the previous time point, $T_{n+1}$ is the following time point and $Abs(T_{n\pm1})$ is the absorbance at that particular time point. The mean time of initial crystallization $T_{cr(i)}$ was obtained by observing the point of maximum slope in the slope vs. time plot. The maximum crystallization rate $R_{cr(max)}$ is the slope at $T_{cr(i)}$. The mean time of aggregation $T_{ag}$ was obtained by observing the point of minimum slope in the slope vs. time plot. The maximum aggregation rate $R_{ag(max)}$ is the slope at $T_{ag}$. The presence of aggregation inhibitors was indicated by an increase in $T_{ag}$ relative to control values.

EXAMPLE 3

Determination of the Effects of Calprotectin on Formation of Struvite and Calcium Phosphate Mineral Precipitates Under Intermediate Speed Formation Conditions Precipitation solution—Solutions for the precipitation of struvite and calcium phosphate minerals under the action of urease were composed of the following: up to 3.2 mM Magnesium Chloride; up to 4.3 mM Calcium Chloride; 20.5 mM Potassium Phosphate; 18.7 mM Ammonium Chloride; and 416 mM Urea.

Urease solution—A 100 Units/ml solution of urease (Sigma #U 0251) was prepared in TBS.

Test protein solutions—The following test solutions were prepared: (a) BSA solution: 440 µl of a 20 mg/ml BSA solution in distilled water plus 2.25 ml Tris/DTT buffer; and (b) Calprotectin solution: 296 µl of a 20 mg/ml BSA solution in distilled water plus 2.4 ml of a 1.2 mg/ml solution of calprotectin in Tris/DTT buffer.

Method—Each of the test solutions was combined with 40 ml of precipitation solution to yield a total of 220 µg of protein/ml of solution. Each of these test solution/precipitation solution mixtures was incubated at 37° C. in a rotary incubator at a rotation rate of 200 rpm for a total of one hour. After one hour, each mixture was passed through a 0.22 micron filter (Millipore) to remove any dust or premature precipitates. A portion of the urease solution was added to each mixture, so that the final urease concentration was 0.1 Units/ml. The mixtures were then distributed in 1 ml portions into snap-covered plastic centrifuge tubes (Eppendorf), and were placed in a rotary incubator at 37° C. and 60 rpm. Individual portions of each mixture were removed periodically, in triplicate, and were centrifuged to pellet precipitates. After centrifugation, the supernatant pH was measured with a pH meter, and then the supernatant was removed with gentle aspiration.

Colorimetric analysis of mineral precipitate chemical composition—Precipitated minerals were dissolved in 1 ml of 0.05N HCl, and were assayed using commercial colorometric kits for magnesium (Sigma 595-A) and calcium (Sigma 588-3P), according to manufacturer's instructions.

Data analysis—To confirm that each test solution was subjected to the same increase in pH, a plot of pH versus time was made for each test solution in each experiment. No significant differences among the pH profiles were observed. Data were plotted as pH versus ion concentration, with error bars representing standard error in the ion concentration measurements. There was no significant error in the pH measurements.

EXAMPLE 4

Determination of the Effects of Calprotectin on Formation of Struvite and Calcium Phosphate Mineral Precipitates Under Slow Formation Conditions Precipitation solution—Solutions for the precipitation of struvite and calcium phosphate minerals under the action of urease were composed of the following: up to 3.2 mM Magnesium Chloride; up to 4.3 mM Calcium Chloride; 20.5 mM Potassium Phosphate; 18.7 mM Ammonium Chloride; and 416 mM Urea.

Urease solution—A 100 Units/ml solution of urease (Sigma #U 0251) was prepared in TBS.

Test protein solutions—The following test solutions were prepared: (a) BSA solution: 440 µl of a 20 mg/ml BSA solution in distilled water plus 2.25 ml Tris/DTT buffer; and (b) Calprotectin solution: 296 µl of a 20 mg/ml BSA solution in distilled water plus 2.4 ml of a 1.2 mg/ml solution of calprotectin in Tris/DTT buffer.

Method—Aliquots of the precipitation solution were combined with test protein solutions so that the protein concentration in each mixture was the same. Each mixture was incubated at 37° C. in a rotary incubator at a rotation rate of 200 rpm for a total of one hour. After one hour, each mixture was passed through a 0.22 micron filter (Millipore) to remove any dust or premature precipitates, and to sterilize the solutions. Subsequently, care was taken to preserve the sterility of the mixtures. A portion of the urease solution was added to each mixture, so that the final urease concentration was 0.01 Units/ml. The mixtures were then distributed in 10 ml portions into 15 ml sterile plastic centrifuge tubes, and were tightly capped. The tubes were placed in an inclined rotating-drum tube holder at a rotation rate of 5 rpm inside an incubator set to 37° C. Individual portions of each mixture were removed periodically, and were centrifuged gently to pellet precipitates. After centrifugation, the supernatant pH was measured with a pH meter, and then the supernatant was removed with gentle aspiration.

Microscopic analysis of mineral precipitates—The precipitated minerals were resuspended immediately in a solution that was saturated with respect to struvite and calcium phosphate minerals. Within 30 minutes of centrifugation, the resuspended precipitates were poured onto glass plates, or transferred by pipette onto microscope slides. A random sampling of particles were studied using an Olympus high power microscope, their size, shape, and degree of aggregation were manually recorded, and photographs were taken of representative particles.

EXAMPLE 5

Isolation and Purification of Calprotectin

Preparation of human granulocyte lysate extract—The buffy coat fraction of human blood was obtained and maintained at 4° C. The total volume of buffy coat was recorded, and then was diluted to twice the original volume with pre-cooled Phosphate Buffered Saline (PBS: 137 mM NaCl; 2.7 mM KCl; 4.3 mM $Na_2HPO_4 \cdot 7H_2O$; 1.4 mM $KH_2PO_4$; pH ~7.3), and the solution was mixed well with a long stirring rod.

The mixture was distributed in centrifuge tubes so that each tube contained 1 part Ficoll and 2 parts buffy coat, but did not contain more than 250 ml total. The tubes were centrifuged at 750× g for 25 minutes. After centrifugation, plasma, ficoll, and monocyte/lymphocyte layers were decanted to waste, preserving the erythrocyte/granulocyte pellet. The pellets were resuspended in PBS (total volume= 200 ml) in a 1 liter or larger ehrlenmeyer flask. The cells were diluted to 5× volume (to 1 liter) with room-temperature isotonic ammonium chloride solution (erythrolysis buffer: 155 mM $NH_4Cl$; 10 mM $NaHCO_3$; pH ~7.4) at 25° C., and were stirred to mix thoroughly. The solution was allowed to stand at 25° C. for 10 minutes. A dramatic color change was observed after about five minutes, from a turbid, intense crimson to a clarified, deep burgundy-black. The solution was decanted into centrifuge bottles and centrifuged at 300× g for 5 minutes.

After centrifugation, the supernatant was decanted and the pellets were resuspended in a minimum volume of isotonic ammonium chloride, in a single tube. The tube was re-centrifuged, the supernatant was decanted, and the packed cell volume (pcv) of the grayish-pink pellet was estimated. The pellet was resuspended in 5× the pcv of pre-cooled hypotonic HEPES buffer (10 mM HEPES; 0.2 mM PMSF*; 1.5 mM $MgCl_2$; 0.5 mM DTT*; 10 mM KCl; pH 7.9; *added fresh). Cells were pelleted at 300× g immediately. As much supernatant as possible was decanted, and the cells were resuspended to a final volume of 3× the original pcv with hypotonic HEPES buffer. Cells were allowed to swell for 10 minutes at 4° C. (or on ice).

Cells were homogenized in a dounce homogenizer with 10 slow up and down strokes with a type 'B' pestle. Homogenized cells were poured into centrifuge tubes and centrifuged 15 minutes at 3300× g. The supernatant was decanted into a graduated cylinder, and the volume was recorded. 0.11 vol. of 10× HEPES (cytoplasmic extraction buffer: 300 mM HEPES; 3 mM $MgCl_2$; 140 mM KCl; pH 7.9) were added, and the solution was mixed thoroughly. The sample was ultracentrifuged for 1 hour at 100,000× g. The supernatant was decanted and placed in dialysis tubing. The protein solution was dialyzed against a buffer appropriate to the use to which the protein was to be put.

Purification of calprotectin from human granulocyte extract—For purification of calprotectin, the human granulocyte extract prepared as described above was dialyzed at 4° C. against three successive changes of 50 volumes of TEED buffer (25 mM Tris; 1 mM EDTA; 1 mM ETA; 1 mM DTT; pH 8.0). Dialysis tubing with a molecular weight cut-off of 6,000–8,000 was used. Just prior to dialysis, and after each change of dialysis solution phenyl methyl sulfonyl fluoride (PMSF) was added in sufficient quantity to render the solution 0.2 mM in PMSF.

The dialysate solution was loaded onto a column of Whatman DE-52 ion exchange chromatography material (DEAE, diethylaminoethyl cellulose) equilibrated in TEED buffer. After the loaded column was rinsed with TEED buffer, the proteins were eluted over 10 hours using a linear gradient from 0 mM NaCl to 150 mM NaCl. This gradient was created by mixing TEED buffer and High salt TEED (TEED buffer with 500 mM NaCl) buffer using a pair of high performance pumps and a gradient controller (Pharmacia). Calprotectin was eluted in the first (of two) major protein peaks, between 30 and 75 mM NaCl.

Calprotectin-containing fractions (as assayed by immunological methods and SDS-PAGE) are combined and dialyzed and against two successive changes (50 volumes each) of TEED buffer. The dialysate was centrifuged and the supernatant was loaded onto a MonoQ ion-exchange FPLC column (Pharmacia) equilibrated in TEED buffer. The protein was eluted using a linear gradient from 0 to 100 mM NaCl in 60 ml. Calprotectin eluted between 50 and 70 mM NaCl. Calprotectin-containing fractions that were greater than 90% pure (by SDS-PAGE with silver staining, generally exhibiting only calprotectin and two other prominent protein bands, both slightly smaller than MRP-8) were pooled and dialyzed against three successive changes (50 volumes each) of Tris/DTT buffer (25 mM Tris; 1 mM DTT; pH 8.0). The dialysate was centrifuged and the supernatant was loaded onto a MonoQ ion-exchange FPLC column equilibrated in Tris/DTT buffer. The protein was eluted using a linear gradient from 100 to 150 mM NaCl in 60 ml. Calprotectin eluted at approximately 130 mM NaCl. Calprotectin-containing fractions that were greater than 95% pure were pooled, mixed thoroughly, distributed into small containers and frozen in liquid nitrogen. These samples were stored at −80° C. until needed.

Calprotectin derivatives

The present invention provides information relating to the presence of calprotecin in the matrix of struvite kidney stones, and the ability of calprotectin to inhibit formation of mineral precipitates, particularly of struvite mineral precipitates. In particular, the present invention demonstrates that calprotectin inhibits struvite crystal growth, and also inhibits agglomeration of struvite and/or calcium phosphate mineral crystals. Techniques available in the art can be utilized to produce calprotectin derivatives in which these properties have been altered (i.e. enhanced, reduced, or changed as compared with normal calprotectin).

"Calprotectin derivatives" are versions of the calprotectin protein that differ from naturally occurring calprotectin in that (i) at least one amino acid or other chemical moiety that is present in (i.e. is associated with by virtue of a covalent linkage) naturary-occurring calprotectin has been substituted with another amino acid; (ii) at least one amino acid or other chemical moiety that is present in naturally-occurring calprotectin has been removed; and/or (iii) at least one amino acid or other chemical moiety that is not present in naturally-occurring calprotectin has been added. Such calprotectin derivatives can be produced, for example, using known nucleic acid mutagenesis procedures (see, for example, Sambrook et al. supra, McPherson *Directed Mutagenisis: a Practical Approach* IRL Press, Oxford, 1991, incorporated herein by reference), by chemical synthetic methods, or by chemical or enzymatic cleavage. Calprotectin is known to have a single phosphorylation site. Calprotectin derivatives could be produced that, for example, lack this phosphorylation site, or that have additional phosphorylation sites.

Calprotectin derivatives can be screened for various calprotectin activities such as, for example, antimicrobial activity, inhibitory activity against for example, antimicrobial activity, inhibitory activity against mineral precipitate formation; and/or inhibitory activity against protein kinases using methods known in the art (see, for example, Miyasaki et al., J. Dent. Res. 72: 517, 1993; Steinbakk. Lancet 336: 763, 1990; Murthy et al., J. Immunol. 151: 6291, 1993; Brandzaeg et al., Histopath, 21: 191, 1992; Lancet, 338: 855, 1991; and references cited therein) or described herein. In particular, calprotectin derivatives can be assayed for their effects on formation of mineral precipitates by utilizing an artificial urine system of the present invention.

Preferred calprotectin derivatives are those that maintain inhibitory activity toward mineral precipitate formation. Also preferred are derivatives that maintain calprotectin anti-microbial activity. Particularly preferred are those derivatives with enhanced inhibitory activity toward mineral precipitate formation.

Pharmaceutical compositions and methods

We have demonstrated that calprotectin inhibits formation of mineral precipitates, particularly of struvite mineral precipitates. Known properties of calprotectin suggest that it is likely to be introduced into urine in large amounts during infection. It is therefore likely that the level and/or activity of calprotectin that is present in the urine of a subject who has developed a urinary tract infection is related to that subject's susceptibility to development of infection kidney stones. For example, individuals with reduced levels of calprotectin may be more susceptible to development of struvite kidney stones.

The findings of the present invention particularly suggest that calprotectin is useful as a therapeutic agent, such as in the prevention and/or treatment of struvite kidney stones. Accordingly, the present invention provides pharmaceutical compositions for preventing and/or treating kidney stone disease, the compositions comprising an effective amount of calprotectin and a pharmaceutically acceptable carrier and/or diluent. The present invention also contemplates methods for treating and/or preventing kidney stone disease in a patient, the methods comprising administering to the patient an effective amount of calprotectin.

In some instances, it may be undersirable to administer calprotectin itself to a subject. The present invention therefore contemplates pharmaceutical compositions comprising a factor or factors that regulates calprotectin levels in urine, in combination with a pharmaceutically acceptable carrier or diluent. Such factors include, for example, transcriptional regulators of the MRP-8 and/or MRP-14-genes, factors that influence splicing or translation of MRP-8 and/or MRP-14 transcripts, factors that regulate post-translational modification (e.g. phosphorylation) of calprotectin, and factors that affect the stability of the calprotectin protein.

Circumstances will dictate whether it is desirable to increase or decrease calprotectin levels in a subject's urine. The invention therefore contemplates both pharmaceutical compositions including a factor or factors that increase(s) calprotectin levels, and pharmaceutical compositions including a factor or factors that decrease(s) calprotectin levels.

Acceptable carriers and diluents that can be employed in pharmaceutical compositions of the present invention are well known in the pharmaceutical art, and are described, for example, in Remington's *Pharmaceutical Sciences*, Gennaro, A. R., ed., Mack Publishing Co., Easton, Pa. (1985), which is incorporated herein by reference.

In practicing the methods of the invention, calprotectin (or a calprotectin regiulatory factor) can be employed alone in the form of a composition, or in combination with other pharmaceutical agents. Administration may be carried out using a variety of dosage forms. Preferably, however, administration is by intravenous injection or by direct injection into the urinary system. The useful dosage to be administered and the mode of administration will vary depending upon the age, weight, and particular patient treated. By way of general guidance, a dosage sufficient to achieve a level of protein or peptide between about 1 and 100 µg/ml in the blood stream or the urinary system may be administered. Typically, therapy is initiated at lower dosage levels with dosage being increased until the desired effect is achieved. The patient treated may be any type of mammal, but preferably is a human.

Diagnostic compositions and methods

As discussed above, the findings of the present invention indicate that calprotectin levels and/or activity can be diagnostic of susceptibility to development of infection kidney stones. Accordingly, the present invention also provides diagnostic methods for identifying subjects that are susceptible to infection stone formation. According to the diagnostic methods of the present invention, the urine of an individual who has developed a urinary tract infection is assayed for the presence of calprotectin. Calprotectin protein levels can be detected using immunological techniques (e.g. ELIFA, ELISA) such as those presented in Examples 5 and 6. Alternately or additionally, calprotectin activity levels can be assayed by detecting the ability of the infected individual's urine, or calprotectin isolated therefrom, to inhibit formation of crystalline structures that include struvite. For example, an artificial urine system such as that described herein may be utilized to test the infected individual's urine, or calprotectin isolated therefrom, for its ability to inhibit mineral precipitate formation.

The present invention also provides test kits for diagnostic detection of calprotectin levels in urine samples, for example by radioimmunoassay or enzyme-immunoassay. Test kits according to the invention for a radioimmunoassay contain, for example, a suitable carrier, uncoated or coated with a polyclonal or monoclonal antibody to calprotectin, optionally freeze-dried or concentrated solutions of a monoclonal or polyclonal antibody to calprotectin and/or a radiolabelled derivative thereof, standard solutions of calprotectin, buffer solutions and, optionally, polypeptides and detergents for preventing non-specific adsorption and aggregate formation, pipettes, reaction vessels, calibration curves, instruction manuals and the like. For example, the kits may include data and/or reagents reflecting the levels of calprotectin observed in individuals who are susceptible to struvite kidney stone formation and/or in normal individuals.

Test kits according to the invention for an enzyme-immunoassay contain, for example, a suitable carrier, e.g. microtiter plates or nitrocellulose sheets, optionally freeze-dried or concentrated solutions of a polyclonal or monoclonal antibody to calprotectin and of an enzyme-labelled or biotin-labelled monoclonal or polyclonal antibody to calprotectin, solutions of an enzyme-avidin conjugate, if a biotin-labelled antibody is used, enzyme substrates in solid or dissolved form, standard solutions of calprotectin, buffer solutions and, optionally, polypeptides and detergents, pipettes, reaction vessels, calibration curves, color scale tables, instruction manuals and the like (see above).

EXAMPLE 6

Rapid Detection of Calprotectin in Urine

The method that we utilized for rapid detection of calprotectin in urine utilizes the Pierce Easy-Titer apparatus to carry out an indirect ELISA using a system of standard additions. Essentially, the steps were performed as follows:

Urine samples, with or without added calprotectin, were diluted with TBS buffer and 200 µl aliquots were applied to the nitrocellulose filter of a Pierce Easy-Titer apparatus over a seven-minute peiod (plus or minus one minute). 3% BSA in TBS was then applied (200 µl), at the same flow rate, as a blocker of non-specific binding sites on the nitrocellulose. The primary antibody, mouse anti-calprotectin (MAC-387, Dako Corp.), was diluted 1:200 in BSA/TBS (0.3% BSA in TBS), and was applied (200 µl) to the filter at the same flow rate. The secondary antibody, biotinylated boat anti-mouse (Gibco), was diluted 1:800 in BSA/TBS, and was applied (200 µl) to the nitrocellulose at the same flow rate. BSA/TBS was then applied (200 µl), at the maximum flow rate approximately (one minute), to rinse the nitrocellulose. This rinse step was repeated a total of three times.

At this point, the Easy-Titer apparatus was opened, the cannulae were blotted dry, a microtiter plate was inserted into the holder, and the apparatus was reassembled. The enzyme substrate solution (4 mg OPD in 10 ml phosphate-citrate buffer, 40 µl of 30% hydrogen peroxide added just before use, according to directions in manual from PIERCE) was applied (200 µl) over a period of 10–12 minutes. The microtiter plate was then removed from the apparatus, and the intensity of the colored solution in the wells was measured at 492 nm using a microtiter plate reader. Calprotectin content was calculated by comparison of the calprotectin-spiked urine with the unspiked urine, as compared with a standard curve.

EXAMPLE 7

Detection of Low Levels of Calprotectin in Urine

Low levels of calprotectin can be detected in urine, for example, by using the Ciba/BaChem kit: Inflammatory Protein EIA Set (BioChem Biosciences, Inc. S-1005) according to the instructions included therewith. Basically, a first anti-calprotectin antibody was bound to a microtiter plate, which was subsequently rinsed. A urine sample, or a standard calprotectin sample, was then applied to the microtiter plate, and the plate was rinsed. Avidin-peroxidase complex was then applied to the microtiter plate, which was then rinsed before a peroxidase substrate solution was applied, and a reaction between the peroxidase and the peroxidase substrate was initiated. This reaction was allowed to continue until a stop solution was added. The color intensity of the stopped solutions was determined using a plate reader.

OTHER EMBODIMENTS

The present specification provides a description of certain preferred embodiments of the invention, but is not intended to be limiting thereof. As would be apparent to one of ordinary skill in the art, certain changes can be made, and parameters can be varied, without departing from the spirit or scope of the invention, as set forth in the following claims.

We claim:

1. A method for inhibiting formation of a mineral precipitate in a solution, the method comprising the steps of: providing a solution comprising component ions of the mineral precipitate, or precursors thereof; and contacting the solution with an effective amount of isolated calprotectin, or with a calprotectin derivative.

2. The method of claim 1 further comprising the step of initiating precipitation of mineral precipitates from the solution.

3. The method of claim 2 wherein the step of initiating is performed after the step of contacting.

4. The method of claim 2 wherein the step of initiating is performed before the step of contacting.

5. The method of claim 2 wherein the step of initiating and the step of contacting are performed substantially simultaneously.

6. The method of claim 1 wherein the step of contacting comprises contacting the solution with isolated calprotectin, or with a calprotectin derivative, under conditions and for a time sufficient to inhibit aggregation of mineral particles in the solution.

7. The method of claim 1 wherein the step of contacting comprises contacting the solution with isolated calprotectin, or with a calprotectin derivative, under conditions and for a time sufficient to inhibit crystal growth of mineral particles in the solution.

8. The method of claim 1 wherein the step of providing comprises providing a solution comprising magnesium, phosphate, and ammonium ions, or precursors therefor.

9. The method of claim 2 wherein the step of initiating comprises initiating precipitation of struvite.

10. The method of claim 8 or claim 9 wherein the step of contacting comprises contacting the solution with isolated calprotectin, or with a calprotectin derivative, under conditions and for a time sufficient to inhibit aggregation of struvite particles in the solution with other particles in the solution.

11. The method of claim 10 wherein the step of contacting comprises contacting the solution with isolated calprotectin, or with a calprotectin derivative, under conditions and for a time sufficient to inhibit aggregation of struvite particles in the solution with other particles selected from the group consisting of: hydroxyapatite particles, carbonate-apatite particles, calcium phosphate particles, struvite particles, and combinations thereof.

12. The method of claim 1 wherein the step of contacting comprises contacting the solution with isolated calprotectin, or with a calprotectin derivative, under conditions and for a time sufficient to inhibit growth of struvite particles in the solution.

13. The method of claim 1 wherein the step of providing comprises providing a solution comprising calcium and phosphate ions, or precursors therefor.

14. The method of claim 2 wherein the step of initiating comprises initiating precipitation of calcium phosphate minerals.

15. The method of claim 14 wherein the step of initiating comprises initiating precipitation of calcium phosphate minerals selected from the group consisting of: hydroxyapatite, carbonate-apatite, and calcium phosphate.

16. The method of claim 13 or claim 14 wherein the step of contacting comprises contacting the solution with isolated calprotectin, or with a calprotectin derivative, under conditions and for a time sufficient to inhibit aggregation of calcium phosphate particles in the solution with other particles in the solution.

17. The method of claim 15 wherein the step of contacting comprises contacting the solution with isolated calprotectin, or with a calprotectin derivative, under conditions and for a time sufficient to inhibit aggregation of calcium phosphate particles in the solution with crystals selected from the group consisting of: hydroxyapatite, carbonate-apatite, calcium phosphate, and struvite.

* * * * *